B. C. WILSON.
Pumping Attachment for Hydrant-Hose, &c.
No. 224,370. Patented Feb. 10, 1880.
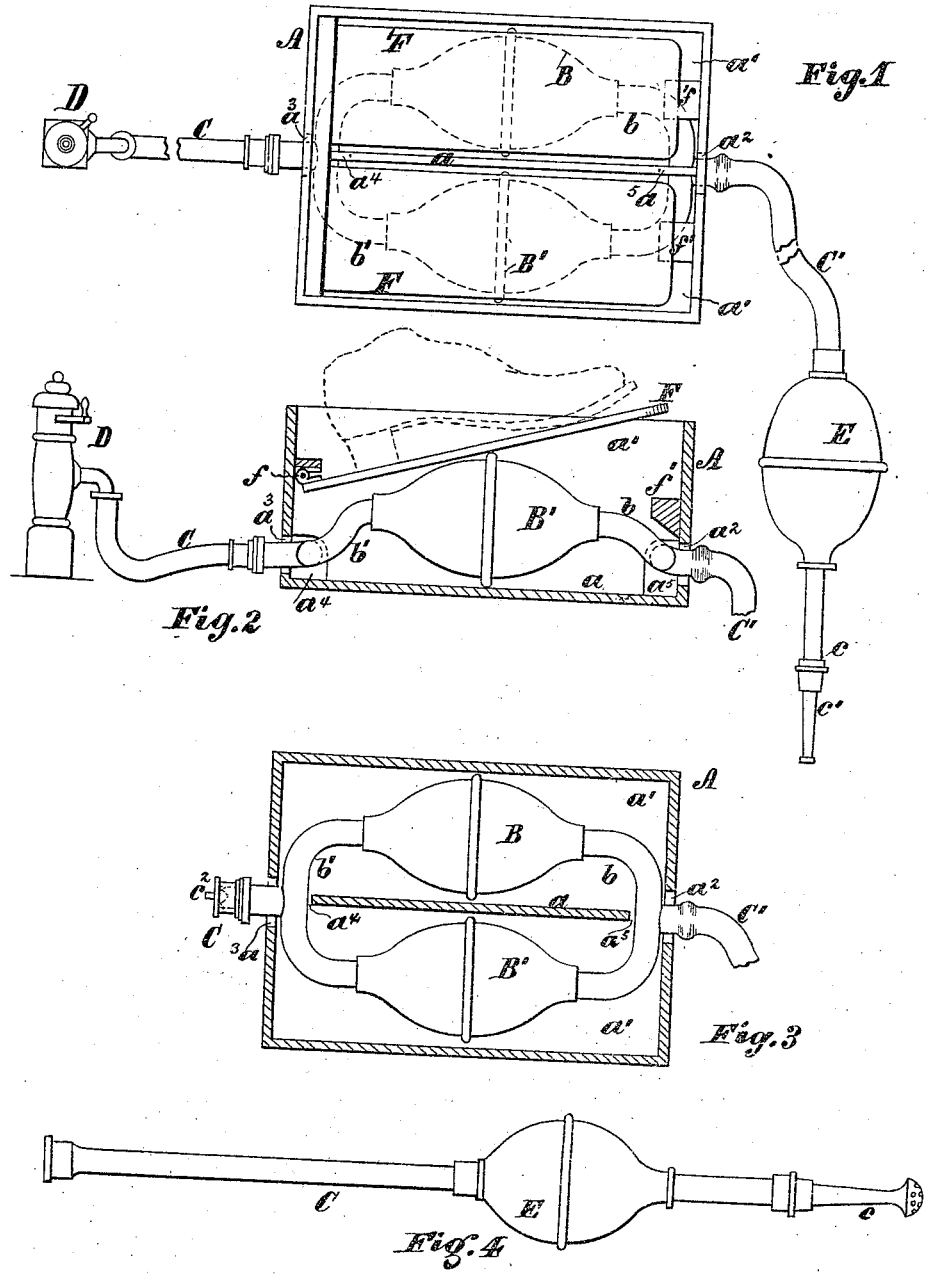
WITNESSES:
Francis Blayney
James Lupton
INVENTOR
Bennet C. Wilson

UNITED STATES PATENT OFFICE.

BENNET C. WILSON, OF PHILADELPHIA, PENNSYLVANIA.

PUMPING ATTACHMENT FOR HYDRANT-HOSE, &c.

SPECIFICATION forming part of Letters Patent No. 224,370, dated February 10, 1880.

Application filed August 7, 1879.

*To all whom it may concern:*

Be it known that I, BENNET C. WILSON, of Philadelphia, in the county of Philadelphia and State of Pennsylvania, have invented certain new and useful Improvements in Pumping Attachments for Hydrant-Hose, &c.; and I do hereby declare the following to be a full, clear, and exact description of the invention, such as will enable others skilled in the art to make and use it, reference being had to the accompanying drawings, which form part of this specification, in which—

Figure 1 is a plan of my invention. Fig. 2 is a longitudinal vertical section. Fig. 3 is a horizontal section of the box for holding the pump, the latter being in plan; and Fig. 4 is a detail elevation.

My invention has for its object to provide a simple, cheap, and effective pump attachment for garden or other hose attached to a hydrant or other device which receives its water under pressure, in order that the water passing through said hose may be projected to an increased distance from the branch pipe of the hose.

My invention accordingly consists of a box partitioned off to form two compartments, in each of which is placed a rubber or other flexible bulb or ball, which are connected to each other at their ends by rubber or flexible tubes. To one of the latter is secured a section of a hose having a connection with a hydrant, and to the other is attached another section of hose, in the path of which is placed an additional rubber bulb, forming an air-chamber, and is provided at its extremity with a branch pipe. Directly over the rubber bulbs, within said box, are flap-valves, hinged to said box, and upon which the operator stands, and by alternating movements of the feet operates the bulbs to act as eduction and induction valves to give the water passing therethrough additional force to project itself to a greater distance from the branch pipe.

Referring to the accompanying drawings, A is a box, divided by the partition $a$ into two apartments, $a'\ a'$, in each of which is placed the flexible or rubber bulbs or balls B B', which have their ends connected by the tubes $b\ b'$, as shown, said tubes passing through openings $a^4\ a^5$ in the partition $a$.

C is a section of a hose, attached at one end to a hydrant, D, its remaining end passing through an opening, $a^3$, in one end of the box A, and is secured to the tube $b'$ in any suitable manner.

C' is another section of a hose, secured at one end to the tube $b$, and, emerging from the box A through the opening $a^2$, has in its path a flexible or rubber bulb, E, formed thereon or attached thereto, and terminates in a screw end, $c$, to which is fastened any one of the various forms of branch pipes, nozzles, sprinklers, &c.

F F' are flap-valves, placed within the apartments $a'\ a'$ directly over and resting upon the bulbs B B'. Said valves are hinged at $f\ f$ to the box A, and $f'\ f'$ are stops secured within the chambers $a'\ a'$, for determining the limit of motion of said valves.

The operation is as follows: The pump being attached to the hose and the latter secured to the hydrant, as shown, the force of water is turned on from said hydrant, the operator taking his position upon the valves F F' and holding the section C' in the hand. The alternating movement of the feet upon the valves F F' correspondingly compresses the rubber bulbs B B' and causes them to act as a pump to give additional force to the water flowing therethrough, so that it will be projected to a greater distance from the branch pipe, the bulb E in the section C' forming an air-chamber and providing for a continuous flow of water through the branch pipe $c'$.

If desired, bellows may be used instead of the rubber bulbs, and in some cases, where great throw and force is wanted, pistons and cylinders may be substituted therefor and operated as described. So, too, instead of the hinged valves F F', a pivoted lever may be used, the ends of which impinge upon the bulbs, bellows, or pistons, which are then operated by working the lever by alternating movement of the feet up and down, seesaw-fashion.

The advantages of the foregoing are plainly discernible.

In watering gardens or other areas of ground the additional force given to the water projects the same over a wider area of space, thereby requiring less length of hose and avoiding the inconvenience and annoyance of transporting the pump attachment from place to place, while the provision for operating the pump by foot-power enables the operator to take the hose in both hands and give undivided attention to effecting the proper distribution of the water over the surface of ground which it is desired to operate upon.

It will also be noticed that I dispense with valves for guarding against the reflex flow of the water.

In my invention such valves are not required, as the attachment is designed to be used in connection with a hydrant, or where the inflowing water is always supplied under a certain degree of pressure, and as the flap-valves are so adjusted to bear on the rear part or end of the bulbs the pressure within and back of said bulbs will always be greater than that exerted by the operator to cause a reflex flow, and the water will necessarily advance toward and go into the air-chamber with the additional force acquired in passing through the bulbs; but if, in any case, the hydrant-pressure should be inappreciable, a valve, $c^2$, may be inserted at the union of the section C and pipe $b'$, as shown in Fig. 3, which will prevent any tendency of backward flow of the water.

What I claim as my invention is—

1. The pump-receiving box A, having partition $a$, apartments $a'$ $a'$, operating-valves F F', and stops $f'$ $f'$, for limiting the range of motion of said valves, substantially as shown and described.

2. The pump composed of flexible or rubber bulbs B B', united at their ends by tubes $b$ $b'$, in combination with the hose-sections C C', the latter being provided with an air-chamber, E, substantially as shown and described.

3. The combination of box A, having one or more apartments $a'$ $a'$, valves F F', flexible bulbs B B', hose-sections C C', the latter being provided with an air-chamber, E, and branch pipe $c'$, substantially as shown and described.

In testimony that I claim the foregoing I have hereunto set my hand this 4th day of August, 1879.

BENNET C. WILSON.

Witnesses:
J. R. MASSEY,
FRANK H. MASSEY.